US011420854B2

(12) United States Patent
Gravelle et al.

(10) Patent No.: US 11,420,854 B2
(45) Date of Patent: Aug. 23, 2022

(54) METHODS FOR ROBOTIC HANDLING OF STORAGE UNITS IN A THREE-DIMENSIONAL STORAGE SYSTEM

(71) Applicant: Attabotics Inc., Calgary (CA)

(72) Inventors: Scott Gravelle, Calgary (CA); Simon Lomas, Calgary (CA); John Earl, Calgary (CA); Sundeep Dhaliwal, Calgary (CA)

(73) Assignee: Attabotics Inc., Calgary (CA)

( * ) Notice: Subject to any disclaimer, the term of this patent is extended or adjusted under 35 U.S.C. 154(b) by 0 days.

(21) Appl. No.: 17/091,494

(22) Filed: Nov. 6, 2020

(65) Prior Publication Data

US 2021/0139302 A1    May 13, 2021

Related U.S. Application Data

(62) Division of application No. 16/354,539, filed on Mar. 15, 2019, now Pat. No. 10,913,641.

(Continued)

(51) Int. Cl.
*B66F 9/06* (2006.01)
*B66F 9/12* (2006.01)

(52) U.S. Cl.
CPC .............. *B66F 9/063* (2013.01); *B66F 9/122* (2013.01)

(58) Field of Classification Search
CPC ............ H01L 21/67259; B65G 1/0457; B65G 1/0414; B65G 1/0421; B65G 1/0428;
(Continued)

(56) References Cited

U.S. PATENT DOCUMENTS

| 4,088,232 A | 5/1978 | Lillt |
| 5,190,427 A | 3/1993 | Lia |

(Continued)

FOREIGN PATENT DOCUMENTS

| CA | 2673932 | 7/2008 |
| CA | 2872496 | 10/2013 |

(Continued)

OTHER PUBLICATIONS

US 9,969,552 B2, 05/2018, Lert, Jr. (withdrawn)

*Primary Examiner* — Glenn F Myers
(74) *Attorney, Agent, or Firm* — Kyle R Satterthwaite; Ryan W Dupuis; Ade & Company Inc.

(57) ABSTRACT

In combination, a storage unit storable within a three-dimensional storage system and a storage/retrieval vehicle navigable through the three-dimensional storage system to storage locations therein at which the storage unit is selectively storable and retrievable. The storage/retrieval vehicle comprises a frame conveyable through the three-dimensional storage system, a platform atop the frame for receipt of the storage unit on the platform, and a loading/unloading mechanism operable to load and unload the storage unit to and from the platform at four different sides thereof. The storage unit and the storage/retrieval vehicle are configured to enable unloading of the storage unit from the platform in any one of four different directions at four different respective sides of the vehicle regardless of an original orientation in which the storage unit was previously loaded onto the platform and without reorienting the storage unit from the original orientation.

20 Claims, 9 Drawing Sheets

Related U.S. Application Data (60) Provisional application No. 62/790,081, filed on Jan. 9, 2019.

(58) Field of Classification Search
CPC ............... B65G 1/0464; B65G 1/0485; G05B 2219/36048; G05B 2219/37002; G05B 2219/37022
See application file for complete search history.

(56) References Cited

U.S. PATENT DOCUMENTS

| | | | |
|---|---|---|---|
| 5,595,263 | A | 1/1997 | Pignataro |
| 7,267,518 | B2 | 9/2007 | Kinzer |
| 7,331,471 | B1 | 2/2008 | Shakes et al. |
| 7,381,022 | B1 | 6/2008 | King |
| 7,591,630 | B2 | 9/2009 | Lert, Jr. |
| 7,686,171 | B1 | 3/2010 | Shakes et al. |
| 7,861,844 | B2 | 1/2011 | Hayduchok et al. |
| 7,963,384 | B2 | 6/2011 | Lafontaine |
| 8,104,601 | B2 | 1/2012 | Hayduchok et al. |
| 8,276,740 | B2 | 10/2012 | Hayduchok et al. |
| 8,622,194 | B2 | 1/2014 | Witt et al. |
| 8,628,289 | B1 | 1/2014 | Benedict et al. |
| 8,731,708 | B2 | 5/2014 | Shakes et al. |
| 8,965,560 | B2 | 2/2015 | Mathi et al. |
| 9,010,517 | B2 | 4/2015 | Hayduchok et al. |
| 8,996,157 | B2 | 5/2015 | Collin |
| 9,122,566 | B2 | 9/2015 | Bastian, II et al. |
| 9,139,363 | B2 | 9/2015 | Lert |
| 9,187,244 | B2 | 11/2015 | Toebes et al. |
| 9,309,056 | B2 | 8/2016 | Lafontaine |
| 9,422,108 | B2 | 8/2016 | Hognaland |
| 9,598,239 | B2 | 3/2017 | Lert, Jr. |
| 9,600,798 | B2 | 3/2017 | Battles et al. |
| 9,682,822 | B2 | 6/2017 | Lindbo et al. |
| 9,687,883 | B2 | 6/2017 | Hayduchok et al. |
| 9,725,242 | B2 | 8/2017 | Issing et al. |
| 9,796,080 | B2 | 10/2017 | Lindbo et al. |
| 9,815,625 | B2 | 11/2017 | DeWitt et al. |
| 9,821,960 | B2 | 11/2017 | Issing |
| 9,884,721 | B2 | 2/2018 | Suemitsu et al. |
| 10,000,338 | B2 | 6/2018 | Lert, Jr. |
| 10,040,632 | B2 | 8/2018 | Lert, Jr. |
| 2003/0228196 | A1 | 12/2003 | Satchwell et al. |
| 2005/0043850 | A1 | 2/2005 | Stevens et al. |
| 2007/0059132 | A1* | 3/2007 | Akamatsu ............ B65G 1/0421 414/274 |
| 2012/0272500 | A1 | 11/2012 | Reuteler |
| 2013/0181586 | A1 | 7/2013 | Hognaland |
| 2015/0071743 | A1 | 3/2015 | Lert, Jr. |
| 2015/0127143 | A1 | 5/2015 | Lindbo et al. |
| 2015/0225187 | A1 | 8/2015 | Razumov |
| 2015/0291357 | A1 | 10/2015 | Razumov |
| 2016/0130086 | A1 | 5/2016 | Yamashita |
| 2016/0140488 | A1 | 5/2016 | Lindbo |
| 2016/0347545 | A1 | 12/2016 | Lindbo et al. |
| 2016/0355337 | A1 | 12/2016 | Lert, Jr. et al. |
| 2017/0129703 | A1 | 5/2017 | Lindbo et al. |
| 2017/0140327 | A1 | 5/2017 | Lindbo |
| 2017/0166400 | A1 | 6/2017 | Hofmann |
| 2017/0313514 | A1 | 11/2017 | Lert, Jr. et al. |
| 2017/0369246 | A1 | 12/2017 | DeWitt et al. |
| 2001/8002546 | | 1/2018 | Watanabe et al. |
| 2018/0037412 | A1 | 2/2018 | Lynch et al. |
| 2018/0134492 | A1 | 5/2018 | Lert, Jr. |
| 2018/0150793 | A1 | 5/2018 | Lert, Jr. et al. |
| 2018/0194556 | A1 | 7/2018 | Lert, Jr. et al. |
| 2018/0215543 | A1 | 8/2018 | Lert, Jr. et al. |
| 2018/0216342 | A1 | 8/2018 | Lert, Jr. |
| 2018/0218469 | A1 | 8/2018 | Lert, Jr. et al. |
| 2018/0247257 | A1 | 8/2018 | Lert, Jr. et al. |
| 2018/0257863 | A1 | 9/2018 | Lert, Jr. |
| 2018/0305123 | A1 | 10/2018 | Lert, Jr. et al. |
| 2020/0024114 | A1* | 1/2020 | Uchimura ................ B66F 9/24 |

FOREIGN PATENT DOCUMENTS

| | | |
|---|---|---|
| CA | 2885984 | 11/2013 |
| CA | 2920361 | 12/2014 |
| CA | 2942445 | 9/2015 |
| CA | 2953028 | 12/2015 |
| DE | 102009017241.6 | 4/2009 |
| EP | 1452462 | 8/2007 |
| EP | 2121204 | 1/2008 |
| FR | 2614609 | 4/1987 |
| GB | 2542651 | 3/2017 |
| GB | 2544649 | 5/2017 |
| GB | 2544650 | 5/2017 |
| JP | 2003341810 | 12/2003 |
| JP | 2015199563 A | 11/2013 |
| JP | 5562646 | 7/2014 |
| JP | 6271509 | 1/2018 |
| KR | 101489337 | 2/2015 |
| WO | 2007068406 | 6/2007 |
| WO | 2013155107 | 10/2013 |
| WO | 2014090684 | 6/2014 |
| WO | 2015019055 | 2/2015 |
| WO | 2015/134529 | 9/2015 |
| WO | 2015197696 | 12/2015 |
| WO | 2016/172793 | 11/2016 |
| WO | 201797724 | 6/2017 |
| WO | 2017108383 | 6/2017 |
| WO | 2017/197121 | 11/2017 |
| WO | 2017197121 | 11/2017 |
| WO | 2017/211640 | 12/2017 |
| WO | 2018/069282 | 4/2018 |
| WO | 201894286 | 5/2018 |
| WO | 2018102444 | 6/2018 |
| WO | 2018132500 | 7/2018 |
| WO | 2018144622 | 8/2018 |
| WO | 2018144625 | 8/2018 |
| WO | 2018144626 | 8/2018 |
| WO | 2018156966 | 8/2018 |
| WO | 2018195200 | 10/2018 |

* cited by examiner

METHODS FOR ROBOTIC HANDLING OF STORAGE UNITS IN A THREE-DIMENSIONAL STORAGE SYSTEM

CROSS-REFERENCE TO RELATED APPLICATIONS

This application is a divisional of U.S. Non-Provisional application Ser. No. 16/354,539, filed Mar. 15, 2019, which claims benefit under 35 U.S.C. 119(e) of U.S. Provisional Application No. 62/790,081, filed Jan. 9, 2019, the entirety of which is incorporated herein by reference.

FIELD OF THE INVENTION

The present invention relates generally to automated storage and retrieval systems useful in order fulfillment environments.

BACKGROUND

Applicant's prior PCT application WO2016/172793, the entirety of which is incorporated herein by reference, disclosed a goods-to-man storage and retrieval system employing a three-dimensional storage grid structure in which a fleet of robotic storage/retrieval vehicles navigate a three-dimensional array of storage locations in which respective bins or other storage units are held. The storage/retrieval vehicles travel horizontally in two dimensions on both a gridded upper track layout disposed above the three-dimensional array of storage locations, and a gridded lower track layout disposed at ground level below the array of storage locations. The same storage/retrieval vehicles also traverse the structure in the third vertical dimension through vertically upright shafts that join together the upper and lower track layouts. Each column of storage locations is neighboured by one of these upright shafts, whereby each and every storage location in the grid is directly accessible by the storage/retrieval vehicles, which are equipped with rotatable turrets by which each robotic storage/retrieval vehicle can access any of the storage locations on all four sides of the shaft.

Continued development has led to numerous improvements in the system design, including improvements to the robotic storage/retrieval vehicles and the storage units compatible therewith, as documented in detail in the following description and appended figures.

SUMMARY OF THE INVENTION

According to a first aspect of the invention, there is provided, in combination, a storage unit storable within a three-dimensional storage system and a storage/retrieval vehicle navigable through said three-dimensional storage system to storage locations therein at which said storage unit is selectively storable and retrievable, wherein said storage/retrieval vehicle comprises a frame conveyable through said three-dimensional storage system, a platform atop said frame for receipt of said storage unit on said platform, and a loading/unloading mechanism operable to load and unload said storage unit to and from said platform at four different sides thereof, wherein said storage unit and said storage/retrieval vehicle are configured to enable unloading of the storage unit from said platform in any one of four different directions at four different respective sides of the vehicle regardless of an original orientation in which storage unit was previously loaded onto the platform and without reorienting said storage unit from said original orientation.

According to a second aspect of the invention, there is provided a storage/retrieval vehicle for use in a three-dimensional storage system delimiting storage locations at which respective storage units are selectively storable and retrievable, wherein said storage/retrieval vehicle comprises a frame conveyable through said three-dimensional storage system, a platform atop said frame for receipt of said storage unit on said platform, and a loading/unloading mechanism operable to load and unload said storage unit to and from said platform; wherein the loading/unloading mechanism comprises an extendable arm that is selectively extendable into a deployed position reaching outwardly beyond a perimeter of the platform, and that comprises a movable shuttle that is engageable with the storage unit and displaceable back and forth along said extendable arm.

According to a third aspect of the invention, there is provided a storage unit for use in a three dimensional storage system navigable by a fleet of storage/retrieval vehicles each having a selectively extendable arm thereon by which the storage unit is engageable to unload said storage unit from the vehicle into a storage location in said three-dimensional storage system and/or load said storage unit onto vehicle from said storage location, said storage unit comprising a primary catch feature engageable by the extendable arms of the storage/retrieval vehicles, wherein said primary catch features is a curved feature lying on a circular path.

According to a fourth aspect of the invention, there is provided a method of handling a storage unit using a robotic storage/retrieval vehicle in a storage system having storage locations disposed on multiple sides of travel paths through said storage system, said robotic storage/retrieval vehicle having a loading/unloading mechanism that is adjustable between four different working states each operable to load and unload said storage unit at a respective one of four different sides of the vehicle, said method comprising, with said storage unit carried on said robotic storage/retrieval vehicle, and while maintaining said storage unit in a static orientation and position on said robotic storage/retrieval vehicle, adjusting the loading/unloading mechanism between two of the four different working states, thereby changing which side of the vehicle said storage unit is offloadable therefrom without re-positioning or re-orienting said storage unit on said vehicle.

According to a fifth aspect of the invention, there is provided a method of handling storage units using a robotic storage/retrieval vehicle in a storage system having storage locations in which said storage units are stored, said method comprising:
  (a) attempting loading of a storage unit from a storage location onto a platform of said robotic storage/retrieval vehicle using a loading/unloading mechanism of said robotic storage/retrieval vehicle;
  (b) performing a load status check using a load status sensing device to detect whether the storage unit has been properly loaded onto said platform of said robotic storage/retrieval vehicle;
  (c) in response to detection by said load status sensing device of a failure to fully load said storage unit onto said platform of said robotic storage/retrieval vehicle, triggering an automatic repositioning of the storage unit in the storage location; and
  (d) re-attempting loading of the storage unit onto the platform of said robotic storage/retrieval vehicle using said loading/unloading mechanism thereof.

BRIEF DESCRIPTION OF THE DRAWINGS

One or more preferred embodiments of the invention will now be described in conjunction with the accompanying drawings in which.

DETAILED DESCRIPTION

Figure 1:
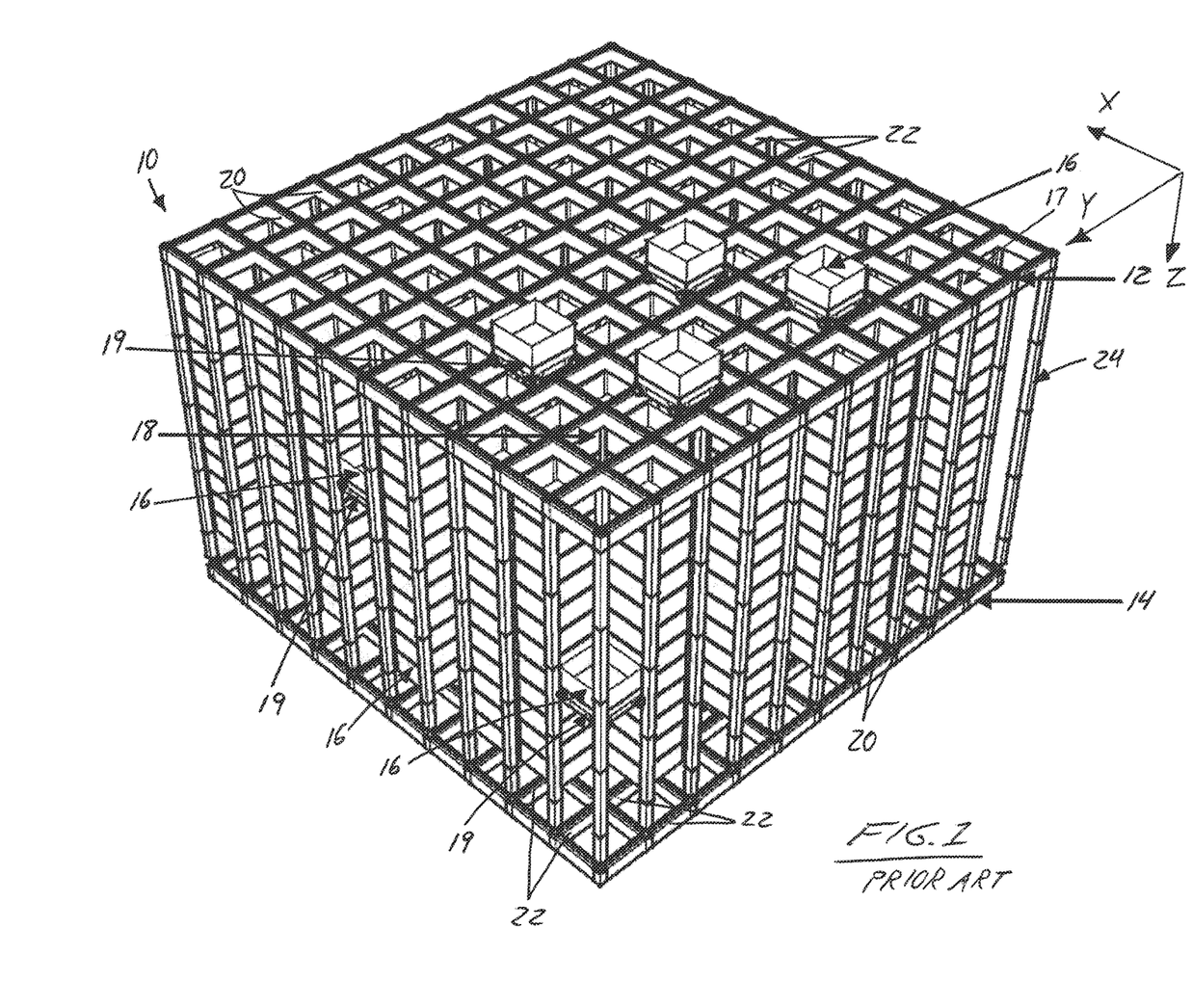
FIG. 1 is a perspective view of a three-dimensional grid structure from Applicant's aforementioned prior PCT application, in which a three-dimensional array of storage units are contained and through which a fleet of robotic storage/retrieval vehicles can travel in three dimensions to access each said storage units.

FIG. 1 illustrates the three-dimensional grid structure 10 from Applicant's aforementioned prior PCT application. A gridded upper track layout 12 resides in an elevated horizontal plane well above a matching and aligned gridded lower track layout 14 situated in a lower horizontal plane closer to ground level. Between these aligned upper and lower track layouts is a three-dimensional array of storage locations, each capable of holding a respective storage unit 16 therein, for example in the form of open-top or openable/closeable storage tray, bin or tote capable of holding any variety of goods therein. The storage locations are arranged in vertical columns, in which storage locations of equal square footprint are aligned over one another. Each such storage column 17 is neighboured by a vertically upright shaft 18 through which its storage locations are accessible. A fleet of robotic retrieval vehicles 19 can horizontally traverse each track layouts in two dimensions, and can traverse vertically between the two track layouts via the open shafts 18.

Each track layout features a set of X-direction rails 20 lying in the X-direction of the respective horizontal plane, and a set of Y-direction rails 22 perpendicularly crossing the X-direction rails in the Y-direction of the same horizontal plane. The crossing rails define a horizontal reference grid of the storage system, where each horizontal grid row is delimited between an adjacent pair of the X-direction rails and each horizontal grid column is delimited between an adjacent pair of the Y-direction rails. Each intersection point between one of the horizontal grid columns and one of the horizontal grid rows denotes the position of a respective vertical storage column 17 or a respective upright shaft 18. In other words, each storage column 17 and each shaft 18 resides at a respective Cartesian coordinate point of the reference grid at a respective area bound between two of the X-direction rails and two of the Y-direction rails. Each such area bound between four rails in either track layout is also referred to herein as a respective "spot" of said track layout. The three-dimensional addressing of each storage location in the system is completed by the given vertical level at which the given storage location resides within the respective storage column 17. That is, a three-dimensional address of each storage location is dictated by the horizontal grid row, horizontal grid column and vertical column level of the storage location in the three-dimensional grid.

A respective upright frame member 24 spans vertically between the upper and lower track layouts at each intersection point between the X-direction and Y-direction rails, thereby cooperating with the track rails to define a framework of the three-dimensional grid structure for containing and organizing the three-dimensional array of storage units within this framework. As a result, each upright shaft 18 of the three-dimensional storage array has four vertical frame members 24 spanning the full height of the shaft at the four corners thereof. Each frame member 24 has respective sets of rack teeth arranged in series in the vertical Z-direction of the three-dimensional grid on two sides of the frame member. Each shaft thus has eight sets of rack teeth in total, with two sets at each corner of the shaft, which cooperate with eight pinion wheels on the robotic storage/retrieval vehicles 19 to enable traversal of same between the upper and lower track layouts through the shafts 18 of the three-dimensional grid structure.

Each robotic storage/retrieval vehicle 19 has both round conveyance wheels for conveyance of the robotic storage/retrieval vehicle over the upper and lower track layouts in a track-riding mode, and toothed pinion wheels for traversal of the robotic storage/retrieval vehicle through the rack-equipped shafts in a shaft-traversing mode. Each pinion wheel and a respective conveyance wheel are part of a combined singular wheel unit, of which the entirety, or at least the conveyance wheel, is extendable in an outboard direction from the vehicle for use of the conveyance wheels in a track-riding mode on either track layout, and retractable in an inboard direction of the vehicle for use of the pinion wheels in a shaft-traversing mode engaging the pinion wheels with the rack teeth of the upright frame members of a shaft.

The framework of the grid structure includes a set of shelving brackets at each storage location to cooperatively form a shelf for the storage unit currently stored at said location, whereby any given storage unit 16 can be removed from its storage location by one of the robotic retrieval vehicles 19 without disrupting the storage units above and below it in the same storage column. Likewise, this allows a storage unit to be returned to a prescribed location at any level in the array.

Though omitted in FIG. 1 to reveal the lower gridded track layout 14 at the bottom of the three-dimensional grid, a number of working stations are typically distributed around the perimeter of the lower gridded track layout to serve as destinations to which the robotic retrieval vehicles 19 deliver the storage units 16 pulled from the storage columns. Except for differences explicitly described herein, the framework of the three-dimensional grid structure, the working stations, the robotic storage/retrieval vehicles, the travel thereof horizontally atop the upper and lower track layouts and vertically through the shafts, and their transition between the track-riding and shaft-traversing modes may be the same as described in Applicant's aforementioned prior PCT application, or in Applicant's U.S. provisional patent applications 62/682,691, filed Jun. 8, 2018, and 62/770,788, filed Nov. 22, 2018, the entireties of which are also incorporated herein by reference.

Figure 2:
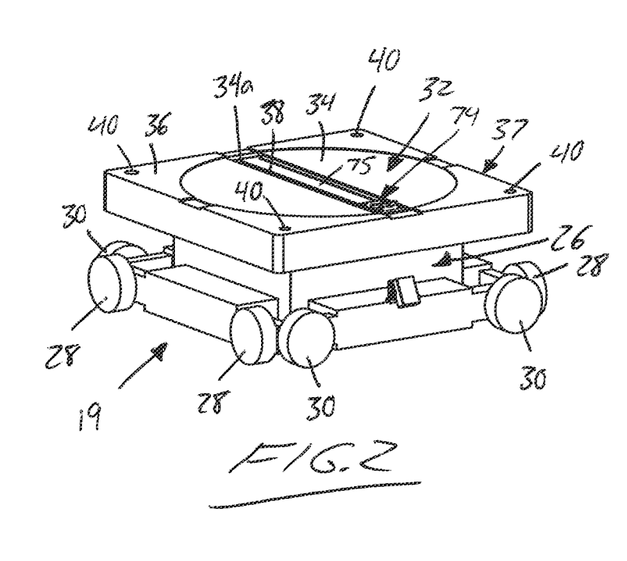
FIG. 2 is a top right perspective view of a robotic storage/retrieval vehicle of the present invention.

FIG. 2 shows one of the robotic storage/retrieval vehicles 19 of the present invention, on which any storage unit 16 of the present invention is receivable for transport thereof within the three-dimensional grid structure to and from, and optionally through, the working stations. In the illustrated example, the storage unit to and from which smaller individual items can be inserted and removed is an open-top bin 16, though as mentioned elsewhere herein above, an openable/closeable box or tote may alternatively be used. In other embodiments, the storage unit may be the packaging of an individual item, as opposed to a container for storing multiple items therein. In other embodiments, where the grid dimensions and working stations are of larger scale, a storage unit may be a pallet on which one or items are received, whether one relatively large individual item, or a plurality of items. In the example of multiple palleted items, the items may be distributed among multiple containers (e.g. boxes, trays, bins or totes) placed or stacked on the pallet, with one or more items stored in each such container.

As disclosed in Applicant's aforementioned prior PCT application, each robotic storage/retrieval vehicle 19 features a frame or chassis 26 on which there are carried a set of four X-direction wheel units 28 arranged in pairs on two opposing sides of the robotic storage/retrieval vehicle, and a set of four Y-direction wheel units 30 arranged in pairs on the other two opposing sides of the robotic storage/retrieval vehicle. Each X-direction wheel unit 28 resides just around the corner from a respective Y-direction wheel unit 30 at a neighbouring side of the vehicle frame 16. The details of the pinion and conveyance teeth and associated drive componentry are omitted for illustrative simplicity, and may be identical to those disclosed in Applicant's aforementioned prior PCT application. Atop the frame 26 is disposed an upper support platform 32 on which the storage unit 16 is receivable for carrying thereof by the robotic storage/retrieval vehicle 19. The illustrated platform features a rotatable turret 34 surrounded by a stationary outer deck surface 36, the outer boundaries of which denote the square outer perimeter 37 of the platform 32.

The turret has a linearly extendable/retractable arm 38 mounted in a diametric slot of the turret and movably supported therein for linear movement into and out of a deployed position extending outwardly from the outer circumference of the turret at an arm-deployment point 34a denoted by one end of the diametric slot. FIG. 2 shows the arm 38 in a fully retracted position contained entirely within the diametric slot so as not to project beyond the outer circumference of the turret. The extendable/retractable function of the arm 38, together with the rotatable function of the turret, allows pulling of storage units onto the support platform, and pushing of storage units off the support platform, at all four sides of the robotic storage/retrieval vehicle. That is, the turret is rotatable into four different working positions, shown in FIG. 14. In each working position, the arm-deployment point 34a on the turret circumference points toward a respective perimeter side of the platform to enable selective extension of the arm 28 outwardly from that side of the platform to interact with a storage unit situated on that side of the vehicle. Accordingly, each vehicle can access a storage unit on any side of any shaft in the three-dimensional grid structure since the arm can be extended to any of the vehicle's four sides.

The turret 34 and surrounding deck surface 36 of the platform collectively define a square landing area atop which the storage unit is seated when carried on the upper platform robotic storage/retrieval vehicle 14. This landing area is equal or nearly equal in size and shape to the underside of each storage unit in the three-dimensional grid structure. This is demonstrated by FIG. 3, where the fully and properly seated position of the storage unit can be seen to occupy a full or near entirety of the landing area without overhanging the outer perimeter of the platform. Accordingly, in its properly seated position on the landing area, the entire footprint of the storage unit resides within the outer perimeter of the platform or landing area.

For the purpose of ensuring that the storage unit is fully received and properly aligned on the landing area of the robotic storage/retrieval vehicle, the upper support platform 32 has a set of load status sensors 40 situated in close proximity to the outer perimeter thereof at spaced apart positions along said perimeter. In the illustrated example, the load sensors are optical sensors recessed in the deck surface 36 of the landing area, and provided in a quantity of four, each positioned proximate a respective one of the four outer corners of the square landing area. As part of a loading routine pulling a storage unit onto the robotic storage/retrieval vehicle from a storage location in the three-dimensional grid using retraction of the extendable/retractable arm, a computer processor communicably connected to the load status sensors, for example a local processor on-board the vehicle, checks the status of the four load status sensors for detected presence of the underside of the storage unit above the sensor. A positive detection signal from all four load status sensors thus confirms the presence of the storage unit at all four corners of the landing area, thereby confirming that the storage unit is fully received on the landing area and is in properly squared alignment thereon.

One embodiment uses reflective optical sensors for load status detection, where light energy transmitted by an optical beam emitter of the sensor is reflected off the underside of the storage unit back to an optical receiver of the sensor when the storage unit is present thereover, thus successfully determining said presence. Time of flight calculation (i.e. difference in time between emission of an optical pulse and detection of the reflected optical pulse) may be used to differentiate between reflection off the underside of a storage bin seated on the landing area of the robotic storage/retrieval vehicle versus reflection off another surface situated further away from the sensor. It will be appreciated that sensor types other than optical sensors may be employed, for example including limit switches mechanically actuated by contact with the underside of the storage unit, or magnetic sensors actuated by presence of cooperating magnetic elements emitting detectable magnetic fields at the underside of the storage unit. However, optical sensors may be preferable to avoid moving parts or need for magnetic integration or other specialized configuration of the storage units.

Figure 3:
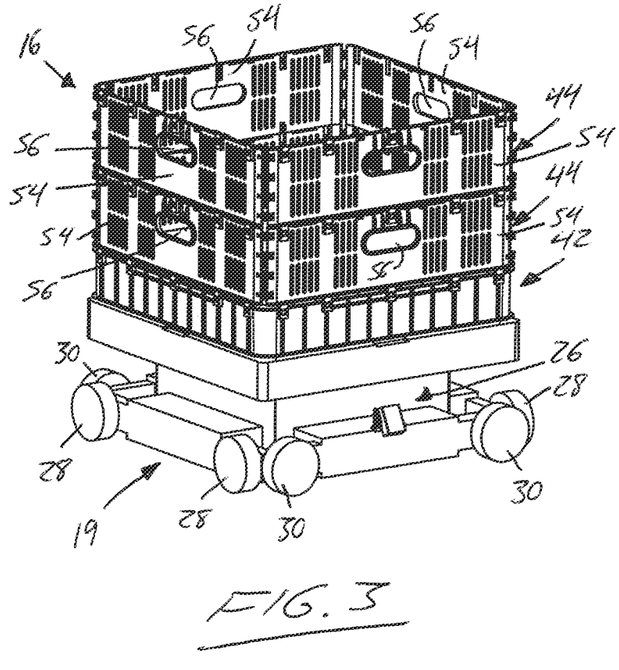
FIG. 3 is a top right perspective view of the robotic storage/retrieval vehicle of FIG. 2 with a modular storage bin in a fully loaded position thereon.
Figure 4:
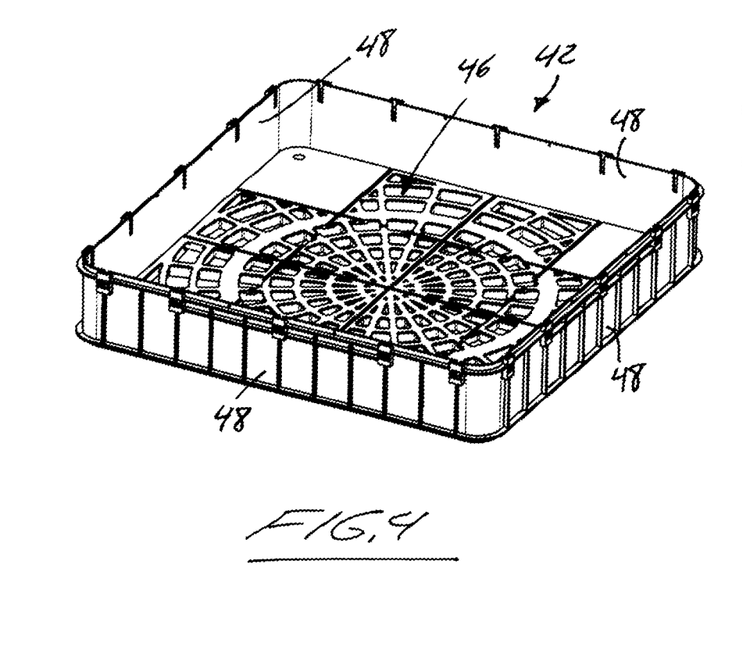
FIG. 4 is a top perspective view of a base module of the modular storage bin of FIG. 3.

Referring to FIG. 3, the storage unit 16 in the illustrated embodiment is a modular storage unit composed at least of a base module 42, and optionally having one or more wall modules 44 stacked atop the base module to increase an overall height of the modular storage unit 16. The base module 42 is the part of the storage unit that is seated on the shelving brackets of the three-dimensional grid structure when disposed in a respective storage location therein, and likewise is the part of the storage unit that is seated on the platform 32 of the robotic storage/retrieval vehicle 19 when carried thereon for conveyance to or from a storage location in the grid structure.

Turning to FIGS. 4 through 8, the base module 42 features a horizontal floor panel 46 of generally equal square shape and size to the platform landing area of the robotic storage/retrieval vehicle 19, and a set of four vertical side walls 48 standing perpendicularly upright from the square floor panel 48 at the four perimeter edges thereof. A height of each side wall 48 is notably lesser than the width of the floor panel 46, whereby the base module 42 has a tray-like shape delimiting a relatively shallow interior space between the four side walls 48 above the floor panel 46. Each optional wall module 44 is bottomless and topless, consisting solely of a set of four rectangular vertical side walls 54 that preferably each have a handle opening 56 therein, and that are laid out on respective sides of a square area matching that of the base module's floor panel. Accordingly, in a stacked position atop the base module, the four side walls 54 of each wall module reside in aligned relation over the side walls 48 of the base module. Accordingly, the wall modules serve as wall extensions to the base module to increase the height of the interior space of the modular storage unit, thus transforming the modular storage unit from a relatively shallow tray into a tote or bin whose deeper interior is delimited by the extended walls of the modular assembly.

The topside of the floor panel 46 of the base module defines a floor area of the interior space of the storage unit, and it is on this floor area that items are placeable within the confines of the side walls for storage of such items inside the storage unit. The underside of the floor panel 46 defines the underside of the overall storage unit, and it is here that a number of catch features are defined for cooperation with a catch member on the extendable/retractable arm of the storage/retrieval vehicle 19 to enable loading and unloading of the storage unit 16 to and from the storage/retrieval vehicle, as described in more detail below. Though the illustrated embodiment employs a modular storage unit, non-modular single-piece storage units may nonetheless employ the same or similar catch features as those disclosed below to provide the same co-operable functionality with the storage/retrieval vehicles of the type described herein.

A primary catch feature in the underside of the storage unit is a circular open-bottom channel 58 that follows a 360-degree circular path around a center point 60 of the floor panel at an intermediate radial distance between this center point 60 and the outer perimeter of the floor panel 46. This circular catch channel 58 can seen from the open bottom side 58a thereof in the bottom plan view of FIG. 6, and from the closed top side 58b thereof in the top plan view of FIG. 7. In FIG. 7, the channel is identifiable from the top due to a perforated skeletal or web-like structure of the floor panel in the illustrated embodiment, where the floor panel features apertures or openings 61 laid out in a series of circular arrays that are centered around the floor panel's center point. The closed top side 58b of the channel 58 is thus visible in FIG. 7 as a continuous ring centered on the center point 60 of the floor panel and residing at an intermediate radial distance between the center point 60 and the floor area's outer perimeter. In other embodiments where the topside of the floor is of a non-perforated, or less-perforated, structure, the open-bottom channel 58 in the underside of the floor panel may not be identifiable at the topside thereof.

Figure 5:
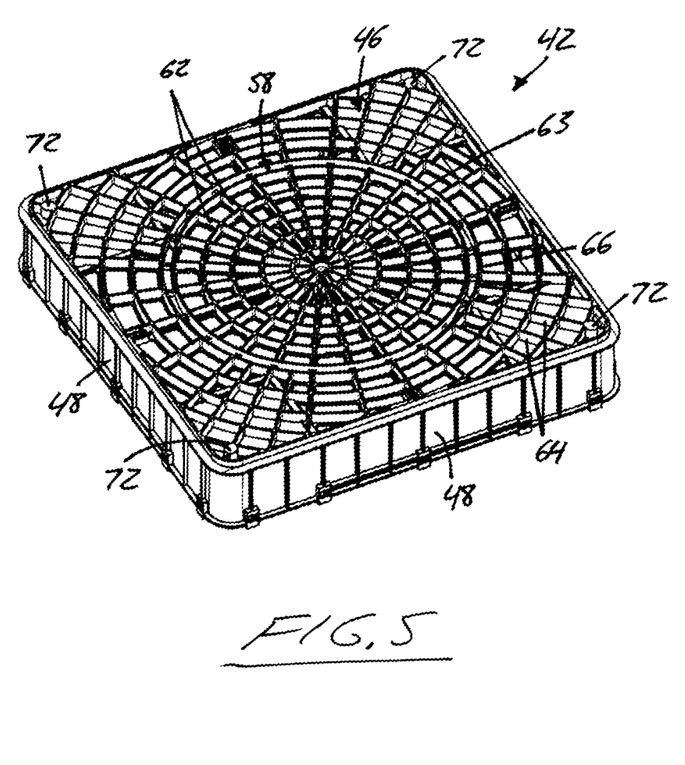
FIG. 5 is a bottom perspective view of the base module of FIG. 4.
Figure 6:
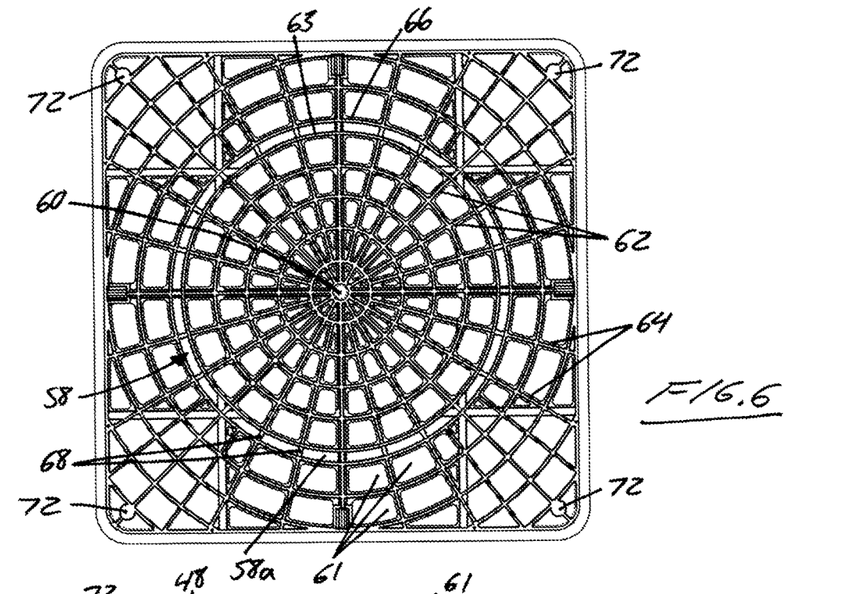
FIG. 6 is a bottom plan view of the base module of FIG. 4.
Figure 7:
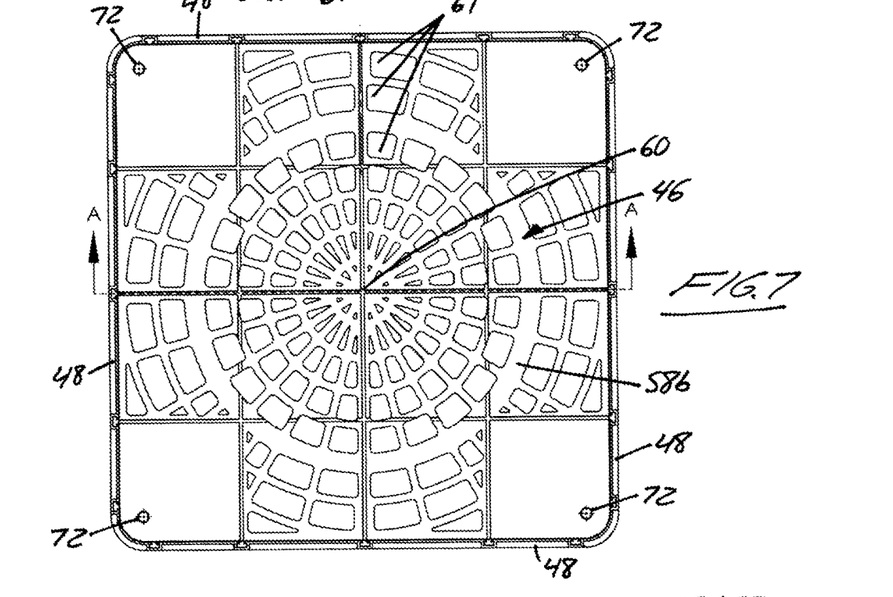
FIG. 7 is an overhead plan view of the base module of FIG. 4.
Figure 8:
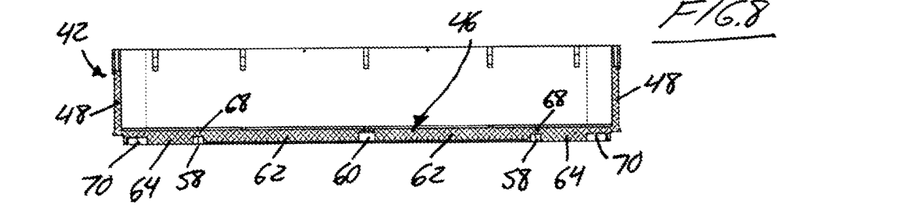
FIG. 8 is a cross-sectional view of the base module of FIG. 7 as viewed along line A-A thereof.
Figure 9A:
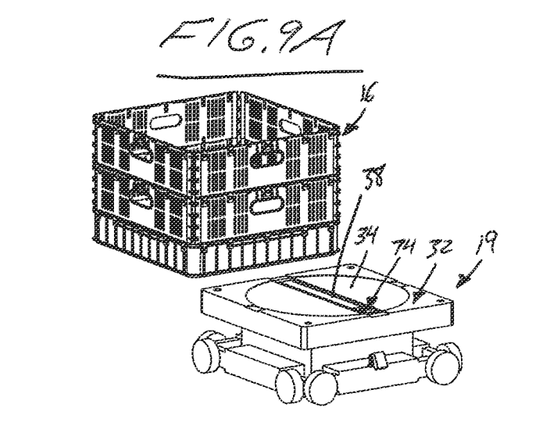
FIGS. 9A through 9F are perspective views illustrating sequential steps of a successful loading process pulling the modular storage bin into the fully loaded position on the robotic storage/retrieval vehicle.
Figure 9B:
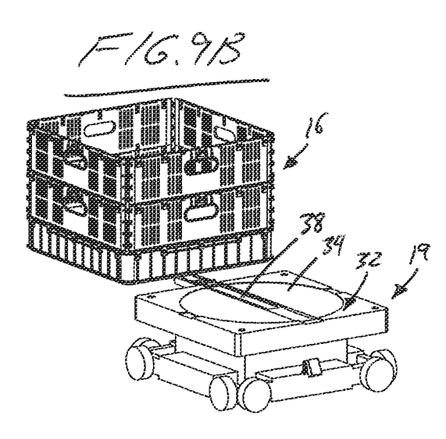
Figure 9C:
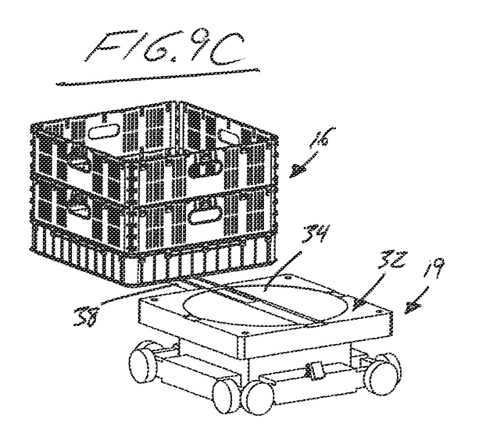
Figure 9D:
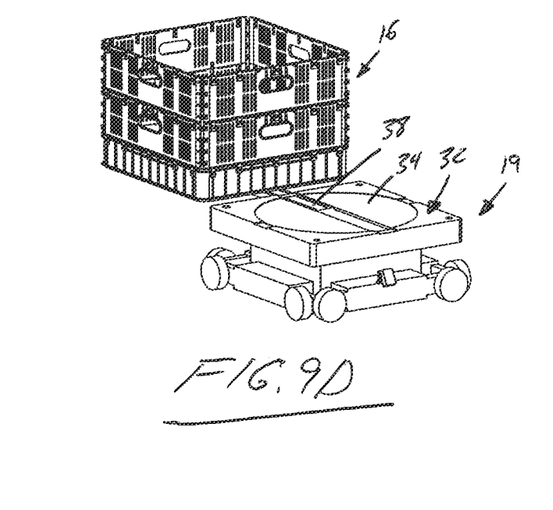
Figures 9E, 9F:
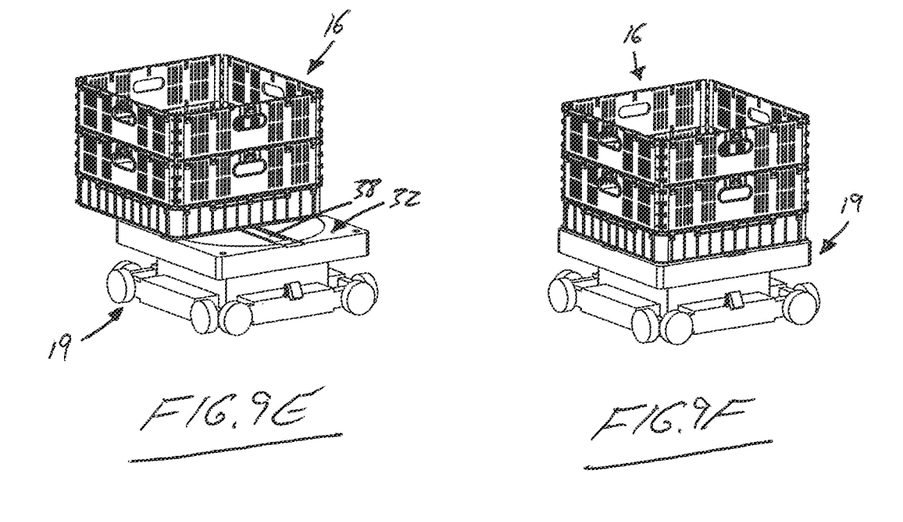

With reference to the bottom views in FIGS. 5 and 6, in the web-like floor panel of the illustrated embodiment, inner radial ribs 62 of the floor panel 46 radiate outward from the center point 60 thereof to an inside wall 63 of the channel 58. Outer radial ribs 64, some of which are aligned with the inner radial ribs, continue from an outside wall 66 of the channel 58 to the outer perimeter of the floor. At this outer perimeter of the floor panel, the outer radial ribs connect with the base module side walls 48 at the bottom ends thereof. As shown, radial braces 68 of lesser height than the radial ribs may interconnect the inside and outside walls 63, 66 of the channel 58 at angularly spaced positions thereareound, for example at angular intervals matching those at which the inner radial ribs are spaced from one another around the center point of the floor panel. The bottom ends of these braces 68 terminate at a greater elevation than the bottom ends of the radial ribs 62, 64 so that a lower half of the channel is entirely open and uninterrupted in its circular path around the center of the floor panel. The bottom ends of the radial ribs 62, 64 all reside coplanar with one another, thus defining a lowermost plane of the storage unit form which the catch channel 58 is recessed upwardly to create a continuous circular slot in which a catch member of the vehicle's extendable arm can be received to enable loading and unloading of the storage bin to and from the vehicle, as described in more detail below.

Just inside the outer perimeter of the floor panel 46 at each of the four sides thereof, the underside of the storage unit features a respective secondary catch recess 70 that is likewise recessed upwardly from the lowermost plane of the storage unit for selective engagement of this catch recess 70 by the catch member of the extension arm shuttle of the storage/retrieval vehicle. However, each catch recess is a relatively small rectangular slot or cavity, unlike the much larger catch channel spanning a substantial circumferential distance around the center the of the floor panel. Each catch recess 70 is located mid-way along the respective perimeter side of the storage unit floor panel 48, thus interrupting a respective one of the outer radial ribs 64 at or near an outer end thereof where this rib perpendicularly intersects the respective side wall 48 of the storage unit at a midpoint thereof. The four secondary catch recesses 70 are thus disposed at ninety-degree intervals from one another around the center point of the storage unit floor just inside the outer perimeter of the storage unit.

In addition to the catch channel 58 and catch recesses 70, the underside of the storage unit features four bosses 72 disposed just inside the outer perimeter of the floor area at the four corners thereof. Each boss 72 forms a cylindrical enlargement on a respective diagonal outer rib that intersects the square outer perimeter of the floor panel at a respective corner thereof. The bottom ends of these bosses 72 are coterminous with the bottom ends of the radial ribs to form enlarged solid surface areas at the lowermost plane of the storage unit for alignment with and detection by the optical sensors 40 at the corners of the vehicle platform 32 when the storage unit is properly loaded in an aligned position thereon. In embodiments where the floor panel 46 is of solid or less perforated structure, the underside of the floor panel may, except for the circular primary catch channel 58 and four secondary catch recesses 70, be a continuous solid surface spanning uninterruptedly from the catch channel 58 to outer corners of the floor panel, thereby omitting the need for the bosses 72 of the skeletal or web-like floor structure of the illustrated embodiment.

The extendable/retractable arm 38 of the storage/retrieval vehicle has a movable shuttle 74 thereon. The shuttle 74 features a horizontal base plate 76 and a raised ridge-like catch member 78 standing vertically upward therefrom in a cross-wise orientation lying perpendicular to the longitudinal direction of the extendable/retractable arm 38 (i.e. the direction in which the arm is elongated and linearly extendable and retractable from the rotatable turret 34). The arm 38 and shuttle forms parts of a loading/unloading mechanism by which the storage/retrieval vehicle can cooperate with the primary circular catch channel 58 of the storage unit 16 to load and unload the storage unit to and from the vehicle 19, and also by which the secondary catch recesses 70 are usable as a backup should the loading mechanism fail to engage the primary circular catch channel 58. The shuttle 74 is movable back and forth relative to the arm 38 at a topside thereof in the longitudinal direction, for example via a closed-loop belt 75 or chain entrained about a motorized pulley or sprocket set carried on same arm 38. An upper run of said belt 75 or chain runs longitudinally of the arm 38 at the topside thereof carries the shuttle 74 thereon, whereby driven revolution of the belt or chain in opposing direction drives linear movement of the shuttle 74 back and forth in the longitudinal direction of the arm 38 at the topside thereof.

Having described the structure of the vehicle's loading/unloading mechanism and the corresponding catch features on the storage unit, attention is now turned to cooperation therebetween to effect loading and unloading of the storage unit to and from the vehicle. FIGS. 9 and 10 illustrating successful performance of a normal loading routine pulling the storage unit onto the platform of the robotic storage/retrieval vehicle, for example from a storage location inside the three-dimensional grid structure of FIG. 1. FIG. 9 shows the process in perspective view with the vehicle and storage unit isolated from the three-dimensional grid structure, while FIG. 10 shows a side view with select elements of the grid structure present for contextual purposes.

Figure 10A:
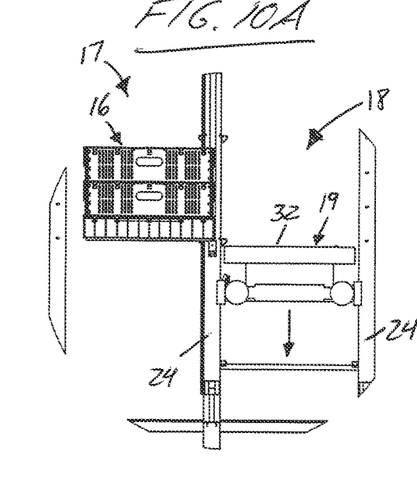
FIGS. 10A through 10F are side elevational views illustrating the sequential steps of the successful loading process during extraction of the modular storage bin from a storage location in the three-dimensional grid structure of FIG. 1.

With reference to FIG. 10A, the robotic storage/retrieval vehicle 19 first travels vertically through a shaft 18 of the grid structure, for example downwardly from the upper gridded track layout, via engagement of the pinion wheels of the robotic storage/retrieval vehicle with rack teeth on the frame members 24 at the corners of the shaft 18, until the robotic storage/retrieval vehicle reaches an initial pre-loading position in which the topside of the vehicle platform 32 resides at an elevation shortly below the lowermost plane of the targeted storage unit 16. If not already situated in the particular working position pointing the arm-deployment point 34a toward the front side of the vehicle that faces the storage column 17 in which the targeted storage unit 16 is currently shelved at a given storage location, then the turret 34 is rotated into this particular forward-facing position working position.

It will be appreciated that the terms front/forward/rear/rearward are used relative to the storage location to or from which a storage unit is being deposited or extracted, and not in absolute terms to refer to specific sides of the vehicle. For example, when interacting with a storage location on a north side of a given shaft 18 of the grid structure in which the vehicle 19 currently resides, the "front side" of the vehicle refers to the north-facing side thereof. On the other hand, when interacting with a storage location on a south side of a shaft, whether the same shaft or otherwise, the "front side" of the vehicle refers to the south-facing side thereof. The vehicle's orientation in three-dimensional space never changes in its travel through the three-dimensional grid structure, so the north-facing side always faces north, the south-facing side always faces south, etc.

Figure 10B:
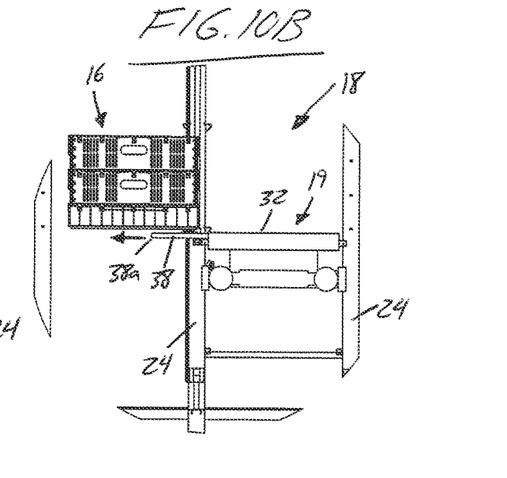
Figure 10C:
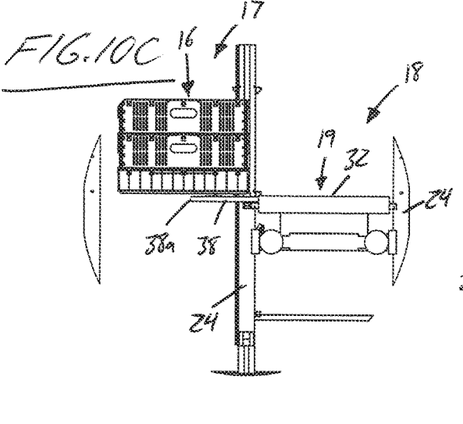
Figure 10D:
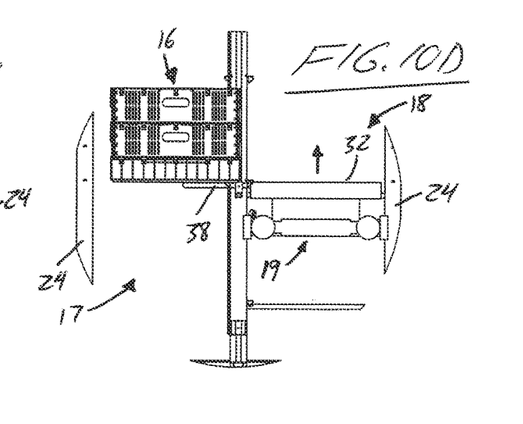
Figures 11, 12:
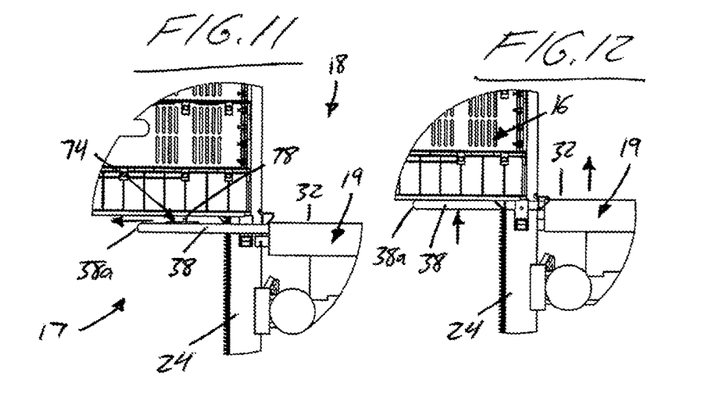
FIGS. 11 and 12 are closeup detailed views of FIGS. 10C and 10D, respectively.

Turning to FIG. 10B, the vehicle extends its arm 38 forwardly out from the turret at this front side of the vehicle, thus reaching the arm 38 forwardly through the open side of the shaft 18 into the storage column 17 at an elevation closely beneath the currently shelved storage unit 16. During this deployment of the arm 38, the shuttle 74 is displaced longitudinally forward on the deployed arm toward a distal end 38a thereof furthest from the turret, as shown in FIG. 11. Such extension of the arm and forward displacement of the shuttle is performed until the shuttle reaches a predetermined point on the arm 38 that is known to directly underlie the primary circular catch channel 58 in the underside of the storage unit 16, provided that the storage unit is seated in a properly shelved position in its current storage location, e.g. abutted against an appropriate stop at the far end of the shelf opposite the shaft 18. FIGS. 10C and 11 represent this stage in the loading routine, where the deployed state of the arm 38 and shuttle 74 have placed the catch member 78 in alignment under the primary circular catch channel 58 in the underside of the storage unit 16. The robotic storage/retrieval vehicle 19 is driven slightly upwardly by its pinion wheel engagement with the rack-toothed frame members 24 at the corners of the shaft 18 to raise the catch member 78 of the shuttle 74 up into engagement with the primary circular catch channel 58, as represented in FIGS. 10D and 12.

Figure 10E:
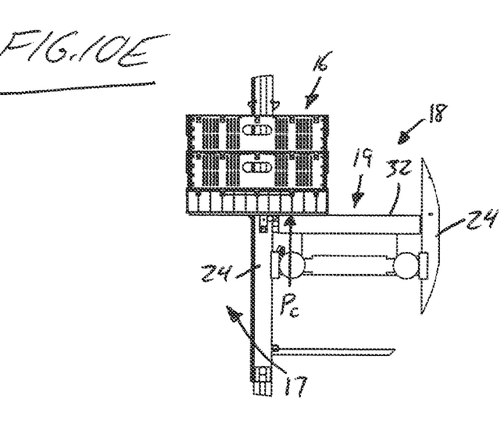

At this point, the deployed arm 38 is retracted, whereby the storage unit 16 is pulled toward the vehicle 19 by the catch member 78 until the shuttle 74 reaches a check position Pc situated inwardly of the perimeter of the vehicle platform 32, thus having pulled the nearest side of the storage unit 16 onto the platform 32 of the vehicle 19, as shown in FIG. 10E. At this point, the on-board processor of the robotic storage retrieval vehicle queries the status of the load sensors 40 to check that the two load sensors adjacent the front side of the vehicle both indicate a positive "load detected" status confirming the presence of the storage unit 16 overtop of these two front load sensors. If the result of this query is positive, then the processor has confirmed successful pulling of the storage unit partially onto the vehicle platform 32.

Figure 10F:
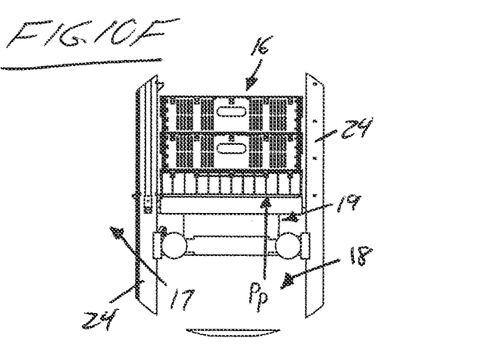

In response, the processor triggers further displacement of the shuttle 72 in the rearward direction away from the distal end 38a of the arm 38, along with further retraction of the arm 38 if not already fully retracted into the rotatable turret 34. With reference to FIG. 10F, the shuttle is driven rearwardly on the fully retracted arm 38 until it passes the center point of the vehicle platform 32 and reaches a predetermined park position Pp that's rearwardly spaced from the platform center point by a distance equal to the radial distance from the center point of the storage unit floor panel to the primary circular catch channel 58 therein. Accordingly, this park position Pp of the shuttle corresponds to a fully loaded position of the storage unit 16 on the vehicle platform 32, as shown in FIG. 10F. Upon arrival of the shuttle at the park position Pp, the vehicle processor queries the four load sensors 40 again to check for a positive "load detected" status from all four load sensors, thereby confirming that the storage bin reached the fully loaded d position and is properly aligned atop the vehicle platform 32.

The forgoing example illustrated in FIGS. 9 and 10 reflects successful completion of a normal loading process, where the catch member 78 of the vehicle's loading/unloading mechanism properly engages the primary circular catch channel 58 of the storage unit, in which case no reliance is made on the secondary catch recesses 70 of the storage unit. On the other hand, FIG. 13 demonstrates how reliance can be made on the secondary catch recesses 70 to enable a successful second loading attempt should engagement of the primary circular catch channel fail during a first loading attempt.

Figure 13A:
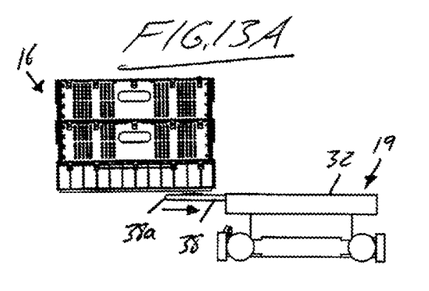
FIGS. 13A through 13D illustrate sequential steps in a failed loading process in which the storage bin is not properly engaged and is only partially loaded onto the robotic storage/retrieval vehicle.
Figure 13B:
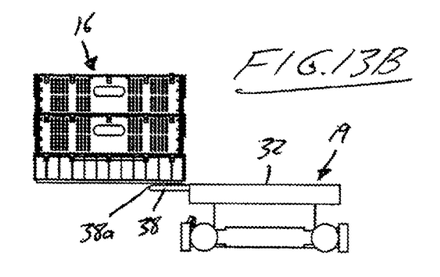

FIG. 13A illustrates the same arm and shuttle retraction step as FIG. 10D, but in an instance where the catch member 78 of the movable shuttle 74 failed to engage in the primary circular catch channel 58 in the preceding step of FIG. 10C. As a result, in FIG. 13A, the initial retraction of the arm 38 and shuttle 74 from their forwardly deployed positions doesn't pull the storage unit 16 outwardly from its shelved position in the storage location of the grid structure. Instead, the catch member 78 on the retracting arm and shuttle rides along the underside of the storage unit 16 toward the secondary catch recess 70 adjacent the side of the storage unit 16 that is nearest the vehicle 19 and faces into the shaft 18. As shown in FIG. 13B, once the moving shuttle 74 arrives at this nearest vehicle-facing side of the storage unit, the secondary catch recess 70 at this nearest side of the storage unit falls onto the catch member 78 of the shuttle 74, thus achieving engagement of between the loading mechanism of the vehicle and the storage unit 16 despite the initial failed engagement at the primary circular catch channel 58.

Figures 13C, 13E:
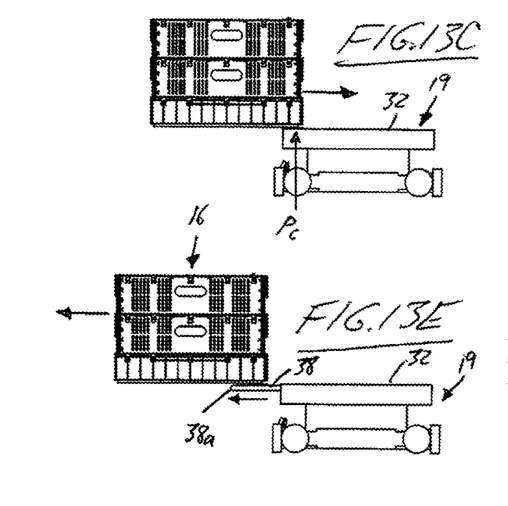
FIGS. 13E and 13F illustrate subsequent repositioning steps to unload the storage bin back into the storage location in preparation for a repeated loading attempt.

As shown in FIG. 13C rearward retraction of the arm 38 and shuttle 74 is continued until the shuttle 74 reaches the check point Pc, thus having pulled the nearest side of the storage unit 16 onto the vehicle platform 19 into a position where a leading portion of storage unit overlies the two load status sensors adjacent the front side of the vehicle. Further retraction of the shuttle 74 is continued in the same manner as described above for the normal successful loading process, thus bringing the shuttle into the park position Pp near the opposing rear side of the vehicle. However, because the pulling of the storage bin 16 was performed at the secondary catch recess 70 near the outer perimeter of the storage unit floor, the storage bin stops short of the second pair of load sensors at the rear side of the platform. Accordingly, query of the load sensors upon arrival of the shuttle at the park position Pp results in a positive "load detected" status at only the two front sensors, and a negative "no load" status at the two rear sensors. This detection by the processor of a negative "no load" status at the rear sensors indicates that there has been a failure to fully load the storage unit 16 onto the vehicle platform 32, as shown in FIG. 13D, but the positive "load detected" status by a partial subset of the load sensors (i.e. the two front sensors) confirms that a partially loaded status was obtained, from which it is concluded that the secondary catch recess 70 was successfully engaged.

In response to this detection that the storage unit wasn't fully loaded, but that the secondary catch recess 70 was engaged, the process initiates a corrective operation intended to offload the partially loaded storage unit from the vehicle back into the storage location, and to re-position the storage unit in a properly shelved condition therein before re-attempting another loading process. To start, the processor initiates forward displacement of the shuttle 74 and forward extension of the arm 38 into the storage column 17, as shown in FIG. 13E, thus pushing the partially loaded storage unit 16 back into the storage location via the catch member's engaged position inside the secondary catch recess 70 of the storage unit. The forward travel of the shuttle from the check position Pc during this forward re-deployment of the arm and shuttle is selected to equal the known distance from which the current engaged secondary catch recess 70 should reside from the stop at the far end of the shelf when the storage unit is fully and properly shelved. Accordingly, the forward re-deployment of the arm and shuttle pushes the storage unit into a fully shelved position in the storage location.

Figures 13D, 13F:
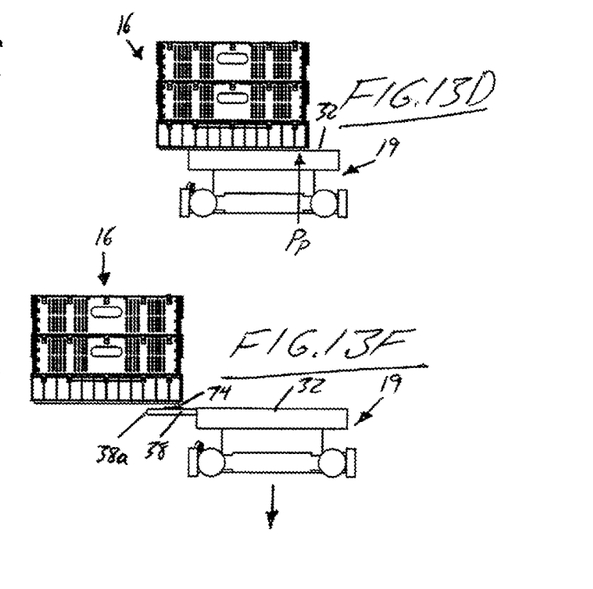
Figure 14A:
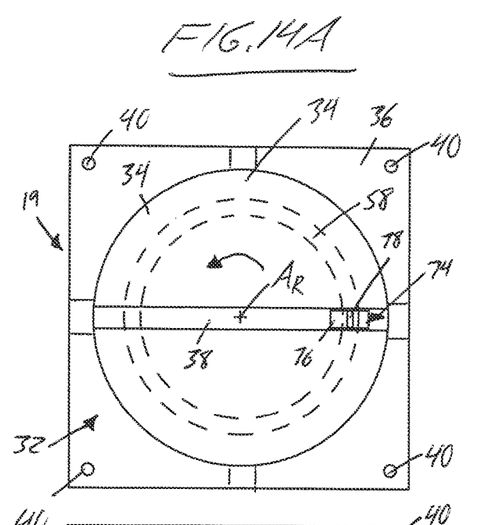
FIGS. 14A through 14D are schematic top plan views of the robotic storage/retrieval vehicle of FIG. 2 with a loading/unloading mechanism thereof rotated into four different working positions, wherein broken lines illustrate a circular catch channel in the underside of a storage bin carried on the vehicle to accommodate rotation of the loading/unloading mechanism relative to the storage unit.
Figure 14B:
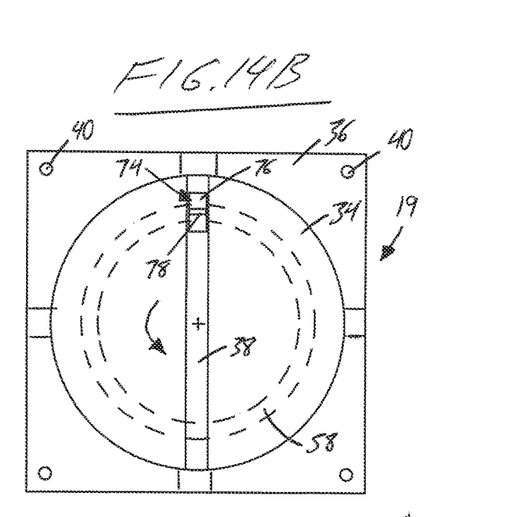
Figure 14C:
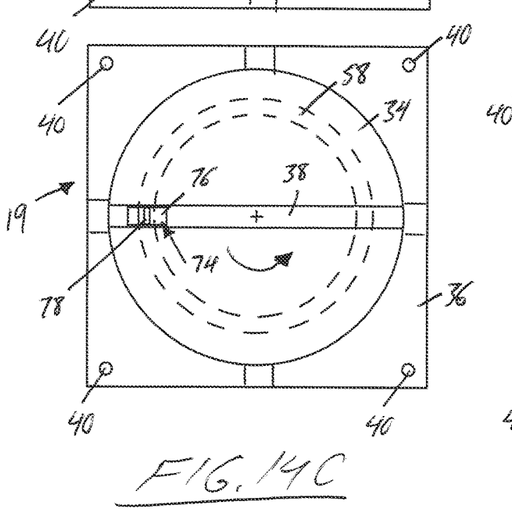
Figure 14D:
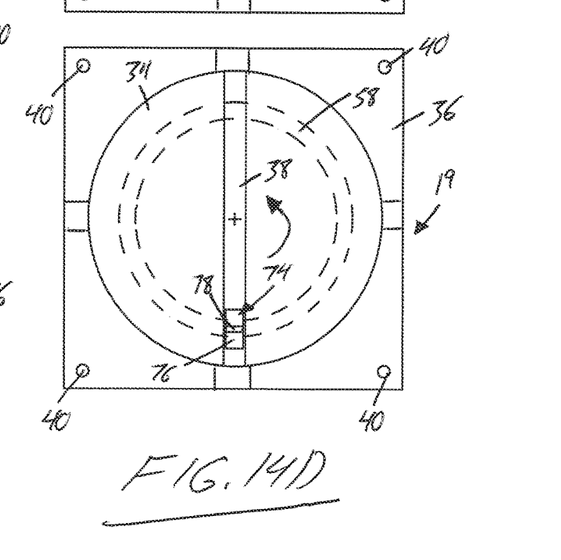

At this point, as shown in FIG. 13F, the robotic storage/retrieval vehicle 19 in the shaft 18 then lowers itself slightly downward via operation of its pinion wheels in order to drop the catch member 78 of the shuttle 74 out of engagement with the secondary catch recess 70 of the storage unit 16, thus placing the shuttle 74 and arm 38 beneath the storage unit 16 in an unengaged position spaced slightly therebelow. At this point, the normal loading procedure steps illustrated in FIGS. 10B through 10F can be repeated to reattempt full and proper extraction and loading of the storage unit from the storage location using the primary circular catch channel 58.

The secondary catch recesses 70 and described cooperation with the loading mechanism thus provides a redundant catch arrangement by which a first failed extraction and loading of the storage unit from the location onto the vehicle, for example due to vibrational shifting or other misalignment of the storage unit 16 from a properly shelved position in the storage location, can be corrected by partially extracting the storage unit 16 from the storage location, and then fully re-inserting the partially extracted storage unit back into the storage location to attain proper alignment on the shelving, and thus enabling enable successful full extraction and loading in a repeated second or attempt to engage the primary circular catch channel. The processor may be configured to perform multiple repositioning operations and loading re-attempts before concluding that further attempts aren't likely to succeed, and instead triggering the transmission of a wireless alarm signal to a central computerized control system responsible for controlling and monitoring the vehicle fleet so that human intervention can be initiated to diagnose and resolve the source of the loading complication.

The inclusion of a redundant catch feature like the perimeter-adjacent catch recesses 70 of the illustrated embodiment may be exploited regardless of whether the primary catch feature is a circular catch channel 58 like that of the illustrated embodiment. On the other hand, the use of a circular catch channel has notable benefit, as demonstrated by FIG. 14, in which the platform of a storage retrieval vehicle is schematically illustrated in top plan view, and the primary circular catch channel 58 of a storage unit seated on the vehicle platform in a fully loaded and aligned position is shown in broken lines.

The topside of the turret 34 resides in slightly recessed elevation relative to the surrounding deck surface 36 of the vehicle platform 32, whereby the underside of the storage unit 16 carried on the vehicle platform 32 sits in direct contact only with the slightly higher deck surface 36, and not with the topside of the rotating turret 38. Of the extendable/retractable arm 38 and the movable shuttle 74 carried thereon, only the catch member 78 of the shuttle 74 reaches and exceeds the elevation of the deck surface 36. The center point of the storage unit's floor panel 46, around which the primary circular catch channel 58 is centered, is coincident with the center point of the vehicle platform 32, and both of these center points are coincident with the vertical rotation axis AR of the turret 38. The circular catch channel 58 thus allows rotation of the turret 34 to be performed while the storage unit remains statically seated in a stationary position on the deck surface 36, as the catch member 78, normally maintained in the parked position Pp on the retracted arm 38 of the turret 34, can simply travel through the circular catch channel 58 on a revolutionary path around the rotational axis AR during the rotation of the turret FIG. 14 illustrates rotation of the turret through a full 360-degrees, thereby demonstrating attainment of the any of the four different working positions of the turret, without the seated storage unit 16 ever having to be removed from, or reoriented on, the vehicle platform 32.

This enables unloading of a vehicle-carried storage unit into any available storage space on any side of any shaft of the three-dimensional storage grid regardless of what orientation the storage unit was originally placed on the vehicle. Accordingly, a vehicle having retrieved a storage unit from a north side of one shaft can subsequently re-stock that storage unit at any storage location on any side of any shaft, whether on the north, south, east or west side thereof, without the storage unit ever having to be removed from, or re-oriented on, the vehicle. In the illustrated embodiment, the circular channel spans a full 360-degrees, thus enabling the turret to rotate into any of its four different working positions in either direction about the turret's rotational axis. While this full 360-degree span is preferable, it will be appreciated that a 270-degree span would be sufficient to accommodate the catch member of the shuttle in any of the turret's four working positions, though this would require knowledge of the orientation in which the storage unit resides on the vehicle in order to limit movement of the catch member to the angular region spanned around the turret's rotational axis by catch channel of the currently-carried storage unit. In the preferred 360-degree embodiment, the orientation in which a storage unit is placed or loaded onto the vehicle is of no consequence.

Turning to FIG. 15, the process of unloading a storage unit 16 from the vehicle 19 into a storage location in the grid structure is basically a reversal of the normal loading procedure described with reference to FIG. 10. Referring to FIG. 15A, the vehicle 19 first travels vertically through a shaft 18 of the grid structure, for example downwardly through the shaft from the gridded upper track layout, via engagement of the pinion wheels of the vehicle with rack teeth on the frame members 24 at the corners of the shaft 18, until the robot reaches an initial pre-unloading position in which the topside of the vehicle platform 32 resides at an elevation slightly above the shelving brackets of the storage location for which the storage unit is destined. If not already in the forward-facing working position, then the turret 34 is rotated beneath the stationary storage unit into this forward-facing working position.

Figure 15A:
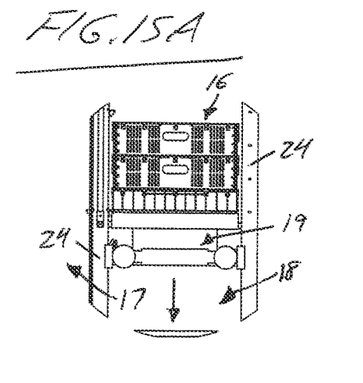
FIGS. 15A through 15F illustrate sequential steps of an unloading process pushing the modular storage bin off of the robotic storage/retrieval vehicle into a selected storage location in the three-dimensional grid structure.
Figure 15B:
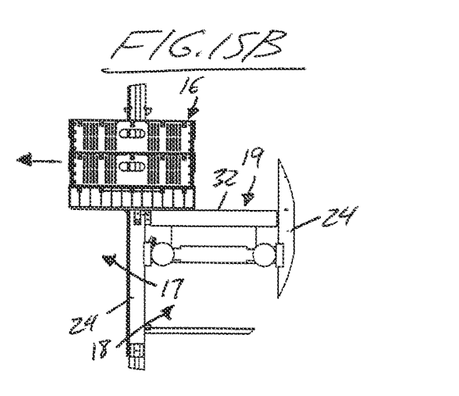
Figure 15C:
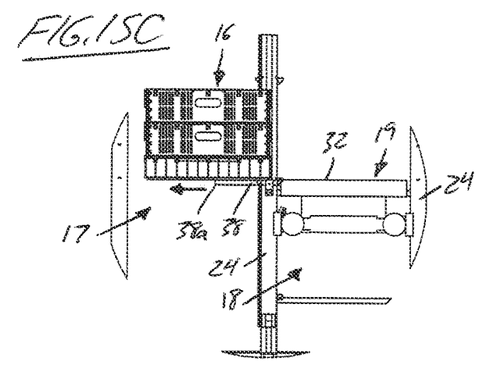
Figure 15D:
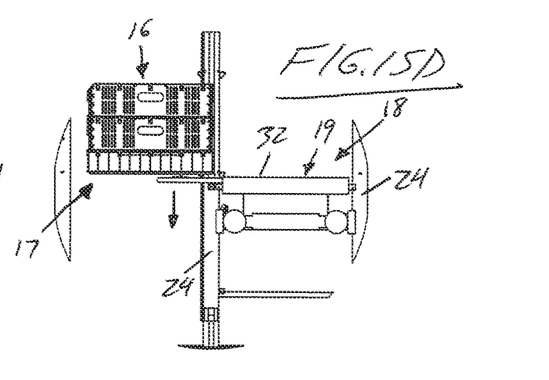
Figure 15E:
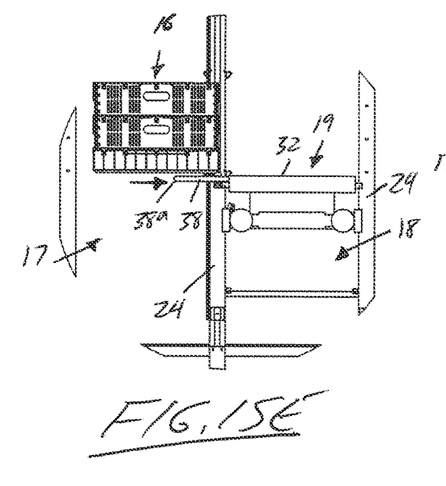
Figure 15F:
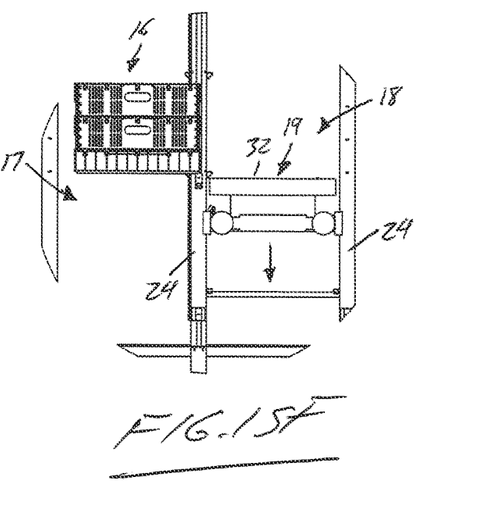

With reference to FIGS. 15B and 15C, the arm 38 is extended forwardly from the turret 34 into the storage column 17 and the movable shuttle is displaced forwardly along the arm. Since the catch member 78 shuttle 74 remains engaged in the primary circular catch channel 58 of the storage unit from the time the storage unit was first loaded or placed on the vehicle, this forward movement of the shuttle 74 from its parked position Pp toward and into the targeted storage location in the storage column 17 pushes the storage unit 16 forwardly onto the shelving of said storage location. As shown in FIG. 15D, once the storage unit 16 is fully unloaded off of the vehicle 19 and onto the shelving, the vehicle 19 lowers itself slightly downward in the shaft 18 via operation of its pinion wheels, thus withdrawing the catch member 78 of the shuttle 74 from the primary circular catch channel 58 of the storage unit. This enables rearward retraction of the extended arm 38 and deployed shuttle 74, as shown in FIG. 15E. With the arm 38 retracted fully into the turret 34, the robotic storage/retrieval vehicle 19 can then travel vertically through the shaft 18 via driven operation of its pinion wheels in order to depart the storage location at which the storage unit was just shelved, and head toward another destination in the grid structure.

While the forgoing describes loading and unloading of storage units to and from the robotic storage/retrieval vehicles particularly at storage locations in storage columns surrounding open vertical shafts in a three-dimensional storage grid, the described capabilities of being and to load and unload at all four sides using a singular loading/unloading mechanism that repositions itself into an appropriate one of four different working positions, all without moving a storage unit currently carried on the vehicle, may be employed regardless of the particular operating environment of that robotic storage/retrieval vehicle. Accordingly, such capabilities may be employed in any variety of three-dimensional storage systems in which the robotic storage/retrieval vehicles need to access locations on multiple sides of available travel paths through said system, whether or not said travel paths are specifically vertical shafts of a three-dimensional grid structure.

Also, while the illustrated embodiment uses a circular catch channel in the storage bin to accommodate rotational motion of the turret of the loading/unloading mechanism while the storage unit sits stationary in a static orientation atop the vehicle platform, other embodiments may employ other approaches to accommodate such relative movement of the loading/unloading mechanism into its four different working states operable to load/unload at the different sides of the vehicle platform. In one alternative embodiment, the catch member may be movable between a raised engagement position for engagement with a catch feature in the underside of the storage unit, and a lowered disengagement position for disengagement from said catch feature, whereby once the storage unit is fully loaded onto the vehicle platform, the catch member is lowered into the disengagement position, thus allowing rotation of the turret, arm and shuttle relative to the storage unit seated on the deck surface.

In another alternate embodiment, instead of a ring-like circular catch channel curving angularly about the center of the storage unit at a radial distance outward therefrom, the primary catch feature may be a central recess centered in the underside of the storage unit floor, provided the deployed positions of the arm and shuttle are sufficient to reach this central point on the storage unit. The illustrated embodiment has at least one advantage over such embodiments, in that since the ring-like circular catch channel is located nearer to the respective perimeter side of the storage unit from which the vehicle is interacting therewith, the extension/retraction distance of the vehicle arm is reduced, as can be seen in the drawings where the outward reaching distance of the arm from the vehicle in the deployed arm position is less than half of the storage unit width. The illustrated embodiment in which the arm of the vehicle's loading/unloading mechanism features a moving shuttle thereon is also beneficial in maximizing the compatible storage unit size relative to the vehicle platform while minimizing the necessary extension/ retraction distance of the vehicle arm, though other embodiments could employ a longitudinally fixed catch member of static longitudinal position on the extendable/retractable arm without detriment to other novel and inventive features of the illustrated embodiment.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of handling a storage unit using a robotic storage/retrieval vehicle in a storage system having storage locations disposed on multiple sides of travel paths through said storage system, said robotic storage/retrieval vehicle having a loading/unloading mechanism that is adjustable between four different working states each operable to load and unload said storage unit at a respective one of four different sides of the vehicle, said method comprising, with said storage unit carried on said robotic storage/retrieval vehicle, and while maintaining said storage unit in a static orientation and position on said robotic storage/retrieval vehicle, adjusting the loading/unloading mechanism between two of the four different working states, thereby changing which side of the vehicle said storage unit is offloadable therefrom without re-positioning or re-orienting said storage unit on said vehicle.

2. The method of claim 1 wherein switching said loading/unloading mechanism between said first and second working states comprises rotating said loading/unloading mechanism therebetween, and during rotation of the loading/unloading mechanism, accommodating relative movement between the statically maintained storage unit and a catch member of said loading/unloading mechanism using a catch channel of the storage unit that follows a circular path around a rotational axis of said loading/unloading mechanism.

3. The method of claim 2 wherein said catch channel spans at least 270-degrees of said circular path.

4. The combination of claim 3 wherein said catch channel spans a full 360-degrees of said circular path.

5. A method of handling storage units using a robotic storage/retrieval vehicle in a storage system having storage locations in which said storage units are stored, said method comprising:
 (a) attempting loading of a storage unit from a storage location onto a platform of said robotic storage/retrieval vehicle using a loading/unloading mechanism of said robotic storage/retrieval vehicle;
 (b) performing a load status check using a load status sensing device to detect whether the storage unit has been properly loaded onto said platform of said robotic storage/retrieval vehicle;
 (c) in response to detection by said load status sensing device of a failure to properly load said storage unit onto said platform of said robotic storage/retrieval vehicle, triggering an automatic repositioning of the storage unit in the storage location; and
 (d) re-attempting proper loading of the storage unit onto the platform of said robotic storage/retrieval vehicle using said loading/unloading mechanism thereof;
 wherein step (a) comprises failure by the loading/unloading mechanism to engage a primary catch feature of the storage unit, successful engagement by the loading/unloading mechanism of a secondary catch feature, and pulling of the storage unit into a partially loaded position on the platform of the vehicle via said secondary catch feature.

6. The method of claim 5 wherein repositioning of the storage unit in step (c) is performed by the robotic storage/retrieval vehicle.

7. The method of claim 6 wherein repositioning of the storage unit in step (c) is performed by the same loading/unloading mechanism used to attempt and reattempt loading of the storage unit in steps (a) and (d).

8. The method of claim 5 wherein said repositioning in step (c) comprises pushing the storage unit off the platform and fully into the storage location via said secondary catch feature.

9. The method of claim 5 wherein the re-attempting in step (d) comprises disengaging the loading/unloading mechanism from the secondary catch feature, and re-attempting engagement of the loading/unloading mechanism with the primary catch feature.

10. A method of handling storage units using a robotic storage/retrieval vehicle in a storage system having storage locations in which said storage units are stored, said method comprising:
 (a) attempting loading of a storage unit from a storage location onto a platform of said robotic storage/retrieval vehicle using a loading/unloading mechanism of said robotic storage/retrieval vehicle;
 (b) performing a load status check using a load status sensing device to detect whether the storage unit has been properly loaded onto said platform of said robotic storage/retrieval vehicle;
 (c) in response to detection by said load status sensing device of a failure to properly load said storage unit onto said platform of said robotic storage/retrieval vehicle, triggering an automatic repositioning of the storage unit in the storage location; and
 (d) re-attempting proper loading of the storage unit onto the platform of said robotic storage/retrieval vehicle using said loading/unloading mechanism thereof;
 wherein the load-status sensing device comprises multiple load status sensors on the storage/retrieval vehicle, and said failure to properly load said storage unit onto said platform is determined in step (c) by detection of the storage unit by only a partial subset of the multiple load status sensors.

11. The method of claim 10 wherein the multiple load status sensors include one or more front sensors adjacent a front side of the platform from which the loading/unloading mechanism attempts to load the storage unit, and one or more rear sensors adjacent an opposing rear side of the platform, of which said partial subset of the multiple load status sensors comprises only said one or more front sensors.

12. The method of claim 10 wherein said multiple load status sensors are mounted in positions operable to detect an underside of the storage unit when moved into overlying relation to said load status sensors.

13. The method of claim 12 wherein said multiple load status sensors are mounted in recessed relation to a deck surface of the platform, atop which the storage unit is seated when properly loaded onto said platform.

14. The method of claim 12 wherein said multiple load status sensors comprise optical sensors.

15. The method of claim 12 wherein said multiple load status sensors comprise reflective optical sensors.

16. The method of claim 12 wherein said multiple load sensor comprise magnetic sensors.

17. The method of claim 12 wherein said multiple load sensor comprise limit switches.

18. The method of claim 12 wherein said multiple load status sensors are each positioned proximate a different respective corner of a landing area of the platform that is occupied by the storage unit when properly loaded onto said platform.

19. The method of claim 18 wherein said multiple load status sensors comprise four load status sensors disposed respectively proximate to four different corners of said landing area.

20. The method of claim 19 wherein:
the landing area comprises:
  a deck surface of the platform, atop which the storage unit is seated when properly loaded; and
  a rotatable turret of the loading/unloading mechanism that is surrounded by said deck surface, and on which there is carried an extendable/retractable arm of the loading/unloading mechanism that is extendable from four different sides of the storage/retrieval vehicle in four different working positions of said rotatable turret;
and said four load status sensors are disposed respectively proximate four different corners of said deck surface.

* * * * *